United States Patent [19]

Sammataro et al.

[11] Patent Number: 5,716,300
[45] Date of Patent: Feb. 10, 1998

[54] ISOLATED RING GEAR FOR PLANETARY GEAR DRIVE SYSTEMS

[75] Inventors: Stephen R. Sammataro, Norwalk; Jules G. Kish, Milford; Charles J. Isabelle, Winsted, all of Conn.

[73] Assignee: Sikorsky Aircraft Corporation, Stratford, Conn.

[21] Appl. No.: 641,665

[22] Filed: May 1, 1996

[51] Int. Cl.$^6$ .................. B60K 17/02; F16H 13/08; B64C 27/59
[52] U.S. Cl. .................. 475/346; 475/347; 464/67
[58] Field of Search .................. 475/346, 347; 192/70.17, 207; 464/66, 67

[56] References Cited

U.S. PATENT DOCUMENTS

| | | | |
|---|---|---|---|
| 2,775,105 | 12/1956 | Banker | 192/207 X |
| 3,080,733 | 3/1963 | Crankshaw | 464/67 X |
| 4,111,386 | 9/1978 | Kenigsberg et al. | 244/17.27 |
| 5,113,713 | 5/1992 | Isabelle et al. | 74/410 |
| 5,117,704 | 6/1992 | Kish et al. | 74/411 |
| 5,271,288 | 12/1993 | Hayduk et al. | 74/462 |
| 5,310,137 | 5/1994 | Yoerkie et al. | 244/17.27 |
| 5,391,125 | 2/1995 | Turra et al. | 475/346 |
| 5,472,386 | 12/1995 | Kish | 475/338 |
| 5,551,928 | 9/1996 | Sudau | 192/70.17 X |

FOREIGN PATENT DOCUMENTS

| | | | |
|---|---|---|---|
| 872439 | 4/1853 | Germany | 464/67 |
| 2113803 | 8/1983 | United Kingdom | 464/67 |

*Primary Examiner*—Khoi Q. Ta

[57] ABSTRACT

An isolated ring gear (60) for a planetary gear drive system (12), which isolated ring gear (60) is operative transferring torque loads and reducing the transmission of high frequency vibrations from the planetary pinions (36) of the drive system (12) to an adjacent support (50). The isolated ring gear (60) includes and inner ring segment (62), an outer ring segment (64) and a plurality of spring elements (66) disposed between and integrally formed with the inner and outer ring segments (62, 64). The inner ring segment (62) has a plurality of gear teeth ($62_T$) for being disposed in intermeshing combination with the teeth ($32b_T$) of the planetary pinions (36) and the outer ring segment (64) is rigidly affixed to the adjacent support structure (50). The spring elements (66) are operative to transfer torque loads from the inner ring segment (62) to the outer ring segment (64) and, furthermore, provide a torsionally soft load path for reducing the transmission of high frequency vibrations from the inner ring segment (62) to the adjacent support structure (50).

13 Claims, 5 Drawing Sheets

ISOLATED RING GEAR FOR PLANETARY GEAR DRIVE SYSTEMS

TECHNICAL FIELD

This invention is directed to drive systems having improved acoustic characteristics, and more particularly, to an isolated ring gear for use in a planetary gear drive system and operative for reducing the transmission of noise into adjacent support structure.

BACKGROUND OF THE INVENTION

In the field of transmission design, there is a constant search in the art for systems and methods which reduce the transmission of high frequency vibrations, i.e., noise, from the drive system to adjacent support structure. For example, in rotorcraft, it is desirable to isolate the noise generated by the main rotor transmission for abating the noise levels, and consequently, aural discomfort to occupants in the helicopter cockpit and/or cabin. Of particular concern are high frequency vibrations, within the 700–1000 Hz range, which produce the most aural discomfort to the human ear. Such noise is principally produced by the intermeshing gear teeth and is transmitted across the gearbox housing, i.e., the mounting feet thereof, to the adjacent fuselage support structure. More specifically, the primary path for noise transmission is through a ring gear of the planetary gear drive system, which ring gear is rigidly affixed to the gearbox housing.

Various attempts have been made to minimize or cancel high frequency vibrations produced by the transmission drive system and/or to reduce the transmissibility of the vibratory forces emanating therefrom, i.e., isolate the vibrating drive system from its support structure. Yoerkie, Jr. et al. U.S. Pat. No. 5,310,137 discloses an active vibration control system for reducing the noise transmitted through the mounting feet of the main rotor gearbox housing. The control system includes a triad of electro-hydraulic actuators disposed at each mounting foot of the main rotor gearbox housing which are operative, in response to inputs from a digital controller, i.e., signal processing unit, to produce reactive forces that are equal and opposite in magnitude and phase to the vibrations produced by the main rotor assembly. Each actuator of the triad is disposed orthogonally of the others so as to cancel vibrations in the longitudinal, lateral and vertical directions. The system also includes a plurality of accelerometers and/or microphones, which are mounted at critical locations in the cockpit and cabin, for sensing acoustic vibrations. The sensed output of each is processed via the controller algorithms to control the magnitude and phase of the reactive forces provided by the actuators. While this system is capable of canceling a wide spectrum of vibratory forces, i.e., frequency range of noise, the complexity and cost of such system is prohibitive for many applications. Furthermore, the multiplicity of components, i.e., actuators, sensors, controllers, etc., results in lower absolute reliability insofar as the probability for a system failure is a function of the number of system components.

Co-pending, commonly-owned U.S. patent application Ser. No. 08/279,530 entitled "Elastomeric Acoustic Isolator" discloses a passive acoustic isolator for rotorcraft transmissions wherein a selectively tuned elastomeric element is interposed between each mounting foot of the main gearbox housing and the supporting fuselage structure. The elastomeric elements accommodate low amplitude displacement of the gearbox housing thereby attenuating and/or isolating high frequency vibrations emanating from the transmission. While such passive system is considerably less complex and, consequently, more cost effective than the above-described active vibration control system, the displacement of the gearbox housing can result in premature failure of the coupling connections between the shafts which drive or are driven by the transmission. For example, high angular displacement of the gearbox housing can lead to fatigue failure of the coupling connection between the engine drive shaft and the transmission input shaft. Furthermore, such displacement imposes additional design complexity on the flight control system. That is, the actuators which control the collective and cyclic inputs to the main rotor system, are typically mounted, at one end thereof, to the gearbox housing. It will be appreciated that movement of the gearbox housing must be anticipated and nulled to avoid inadvertent control input to the rotor system.

A need, therefore, exists for providing a passive vibration control device which reduces the transmission of noise from a drive system to an adjacent support structure, minimizes the number of component parts, and permits rigid attachment of the drive system to its support structure.

SUMMARY OF THE INVENTION

It is an object of the present invention to provide an isolated ring gear for use in combination with a planetary gear drive system which reduces the transmissibility of high frequency vibrations thereby isolating the support structure from such vibrations.

It is another object of the present invention to provide such an isolated ring gear which is mounted within a gearbox housing and performs vibration isolation independent of the mounting arrangement for affixing the gearbox housing to the support structure.

It is yet another object of the present invention to provide a method for manufacturing such an isolated ring gear wherein a plurality of spring elements are formed as an integral part of inner and outer ring segments of the isolated ring gear.

It is yet a further object of the invention to provide means for preloading the spring elements and/or torque limiting the isolated ring gear to enhance the service life thereof.

These and other objects are achieved by an isolated ring gear for a planetary gear drive system, which isolated ring gear is operative for transferring torque loads and reducing the transmission of high frequency vibrations from the planetary pinions of the drive system to an adjacent support structure. The isolated ring gear includes an inner ring segment, an outer ring segment and a plurality of spring elements disposed between and integrally formed with the inner and outer ring segments. The inner ring segment has a plurality of gear teeth for being disposed in intermeshing combination with the teeth of the planetary pinions and the outer ring segment is rigidly affixed to the adjacent support structure. The spring elements are operative to transfer torque loads from the inner ring segment to the outer ring segment and, furthermore, provide a torsionally soft load path for reducing the transmission of high frequency vibrations from the inner ring segment to the adjacent support structure.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 3b is an enlarged perspective view of a portion of the spring element of FIG. 3a;

BEST MODE FOR CARRYING OUT THE INVENTION

Figure 1:
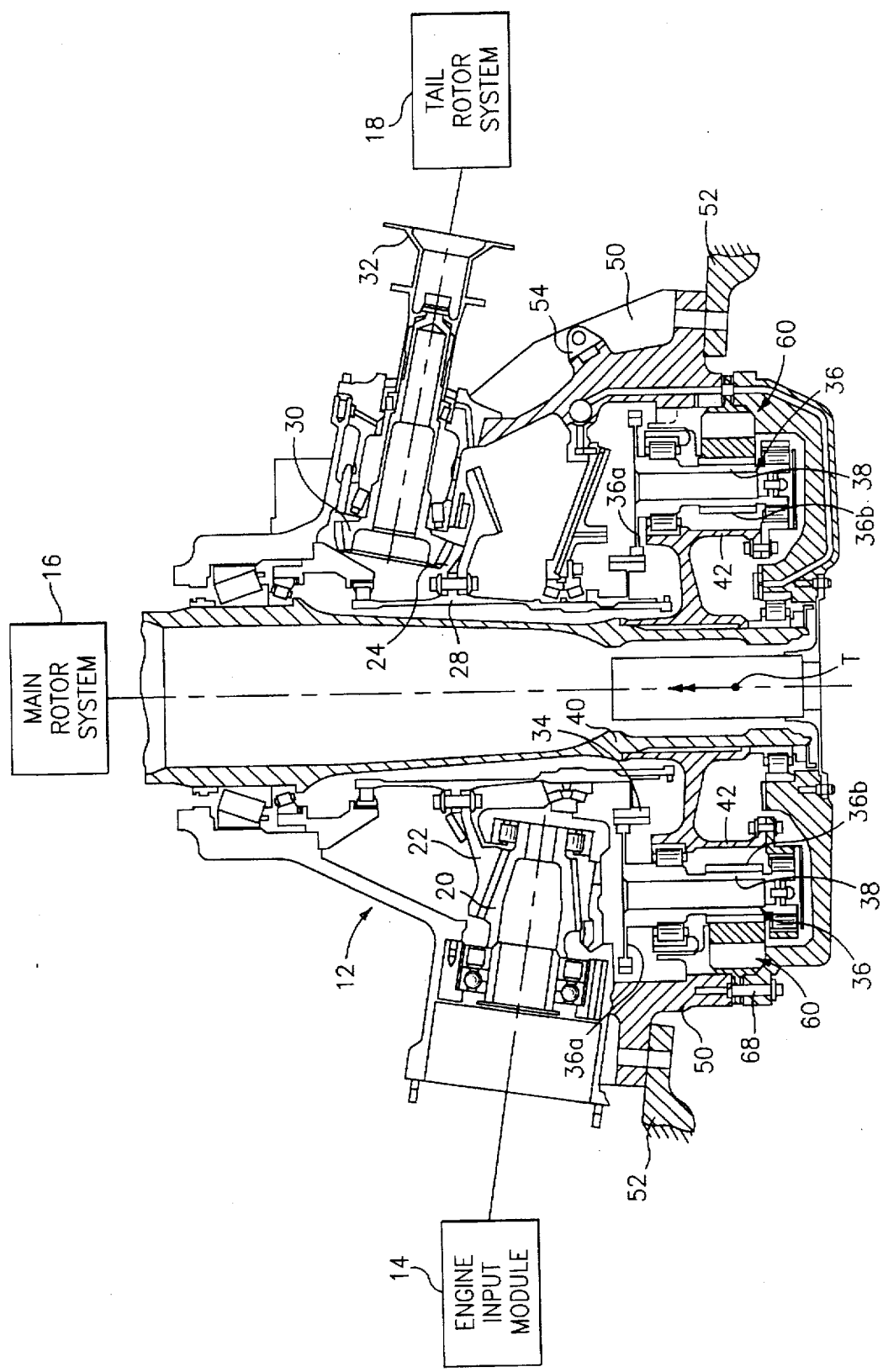
FIG. 1 depicts a partially broken-away and sectioned side view of a planetary gear drive system including a driving sun gear, a plurality of planetary pinions and the ring gear isolator according to the present invention.

Referring now to the drawings wherein like reference characters identify corresponding or similar elements throughout the several views, FIG. 1 depicts an exemplary embodiment of an isolated ring gear 60 for use in a planetary gear drive system, which isolated ring gear 60 is operative for reducing the transmission of high frequency vibrations, i.e., noise, into an adjacent support structure. As used herein, an "adjacent support structure" is any structure to which the isolated ring gear 60 is rigidly affixed including a gearbox housing, the gearbox mounting structure, or structure intermediate the gearbox housing and the isolated ring gear 60. The isolated ring gear 60 is described in the context of a helicopter drive train system, though, it should be understood that the invention may be practiced in any application wherein it is desirable to reduce structure borne transmission of such vibrations, i.e., isolate such vibrations. More specifically, the isolated ring gear 60 will be described in the context of a multi-stage compound planetary drive system, yet, it will be appreciated that the invention is applicable to and may be used in combination with other planetary gear drive systems such as a simple planetary gear transmission.

As shown, a main module 12, hereinafter referred to as the "compound planetary drive system 12" transmits torque from an engine input module 14 to a helicopter main and tail rotor system 16 and 18, respectively. The compound planetary drive system 12 is, furthermore, operative to effect speed reduction via various gear reduction stages so as to efficiently transfer the high speed, low torque output of the engine input module 14 to a high torque, low speed input to the main and tail rotor systems 16, 18. For the described embodiment, the drive system 12 effects about a 29:1 speed reduction for input to the main rotor system 16 and about a 2:1 speed reduction for input to the tail rotor system 18.

The compound planetary drive system 12 includes dual stage reduction gearing wherein the first gear reduction stage is comprised of an input bevel pinion 20 which is driven by the engine input module 14 and drives a main input bevel gear 22. The ratio of gear diameters in the first stage effects a speed reduction of about 4.6:1. The driven main input bevel gear 22, in turn, drives a tail take-off bevel gear 24 through an outer shaft 28. The tail take-off bevel gear 24 drives a bevel pinion 30 which is coupled to the foremost drive shaft (not shown) of the tail rotor system 18 via a drive flange 32. The second gear reduction stage is comprised of a sun gear 34, compound planetary pinions 36 and the isolated ring gear 60 according to the present invention. More specifically, the sun gear 34 is driven by the outer shaft 28 and drives an upper or "primary" planetary pinion 36a of each compound planetary pinion 36. The primary planetary pinion 36a, in turn, drives a secondary planetary pinion 36b of the same compound planetary pinion 36b through a common drive shaft 38. The secondary planetary pinion 36b of each interacts with the isolated ring gear 60 such that the compound planetary pinions 36 traverses in an epicycle about the sun gear 34 and at reduced rotational speed relative thereto. The rotary output of the compound planetary pinions 36 is transferred to a main rotor drive shaft 40 by means of a planetary carrier 42 which is disposed in combination with the common drive shaft 38 of each compound planetary pinion. The speed reduction effected by the second gear reduction stage is about 6.3:1 such that the total speed reduction of the first and second gear reduction stages is about 29:1. For additional details concerning compound planetary drive systems, reference is made to Kish U.S. Pat. No. 5,472,386 which discusses many of the same component elements and, in particular, the advantages of the staggered, biplanar relationship of the primary planetary pinions.

The compound planetary drive system 12 is supported by and disposed internally of a gearbox housing 50 which is rigidly affixed to a stationary support structure 52 of the helicopter fuselage. More specifically, the gearbox housing 50 functions to internally support the shafts and gears of the drive system 12, contain the lubricating fluids used therein, react the torsional and lift loads generated by the main rotor system 16, and provide external mounting points 54 for rotor system control actuators (not shown). As discussed in the Background of the invention, it is through the gearbox housing 50 that high frequency vibrations may be transmitted to the support structure 52. Moreover, it is highly desirable to rigidly secure the gearbox housing 50 to the support structure 52 for obviating gearbox displacements which may over-stress coupling connections, e.g., the drive flange 32 and/or introduce uncommanded control inputs to the rotor system 16. The inventors, therefore, endeavored to configure an isolated ring gear 60 which inhibits the transmission of such vibrations while maintaining a rigid mount between gearbox housing 50 and the support structure 52.

Figure 2:
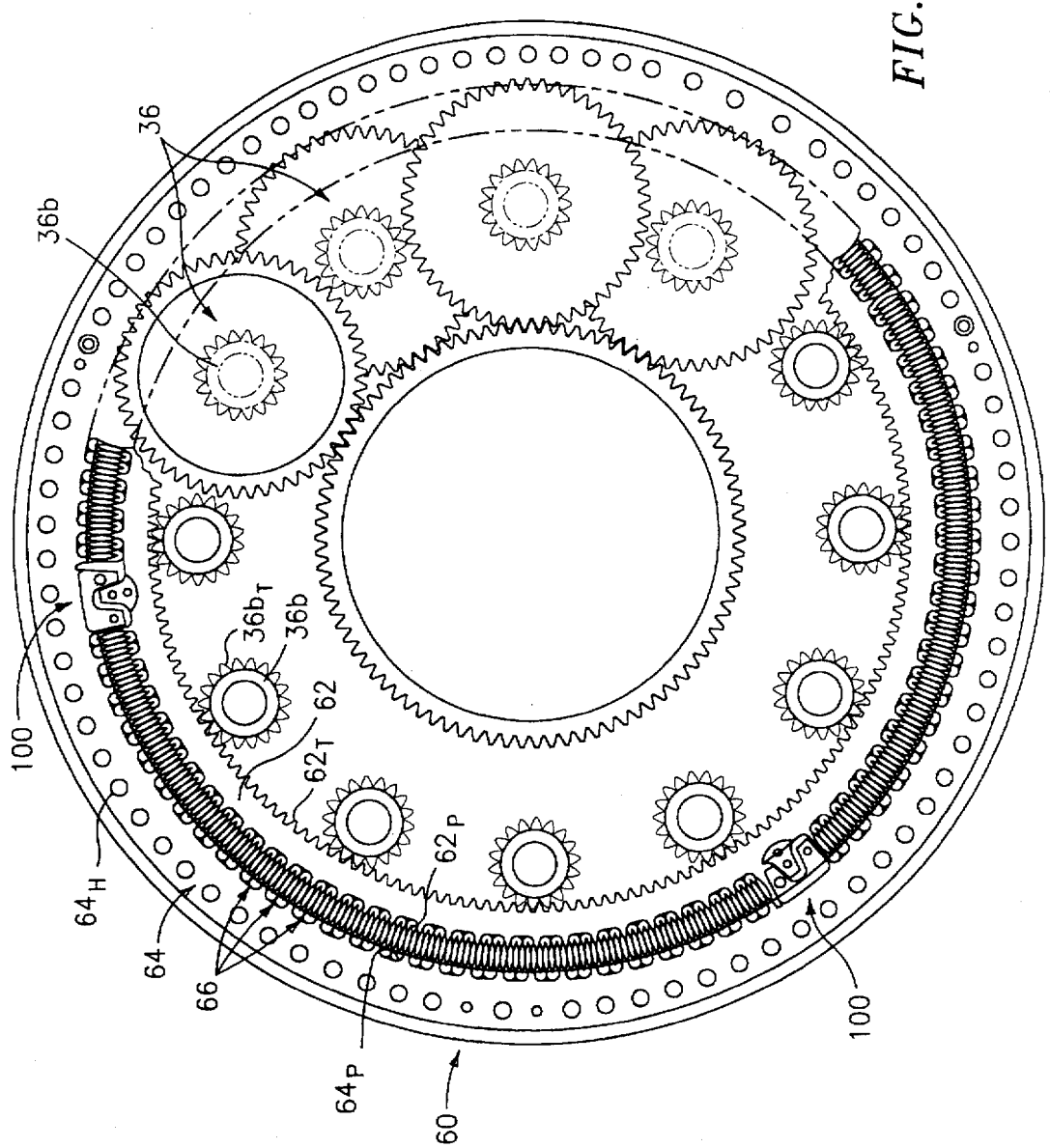
FIG. 2 is a partially broken-away and sectioned top view of the isolated ring gear and the relevant portions of the planetary gear drive system which interact therewith for revealing the various elements of the isolated ring gear including an inner ring segment, an outer ring segment, and a plurality of spring elements disposed between and integrally formed with the inner and outer ring segments.

In FIG. 2, the isolated ring gear 60 includes an inner ring segment 62, an outer ring gear segment 64, and a plurality of spring elements 66 interposed therebetween. The inner ring segment 62 includes a continuous ring of gear teeth $62_T$ for being disposed in intermeshing combination with the teeth $36b_T$ of the secondary planetary pinions 36b of each compound planetary pinion 36. The outer ring gear segment 64 is disposed in combination with the gearbox housing 50 via a plurality of connecting bolts or studs 68 (see FIG. 1) which extend through apertures $64_H$ of the outer ring segment 64. Accordingly, the outer ring gear segment 64 is held stationary by means of its rigid attachment to the gearbox housing which is, in turn, rigidly affixed to the gearbox support structure 52. The spring elements 66 are interposed between and disposed substantially about the entire outermost and innermost periphery, $62_P$ and $64_P$, of the inner and outer ring segments 62, 64 respectively. Furthermore, the spring elements 66 are integrally formed with the inner and outer ring segments 62, 64 such that the isolated ring gear is essentially a unitary structure. That is, the spring elements 66 are produced as one of the fabrication steps in the manufacture of the isolated ring gear 60 and are, accordingly, composed of the same material as the ring segments 62, 64. The various methods for manufacturing the isolated gear will be discussed in subsequent paragraphs.

Functionally, the spring elements 66 transfer torque loads from the inner ring segment 62 to the outer ring segment 64 while furthermore producing a torsionally soft load path for inhibiting the transmission of high frequency vibrations. Such torsionally soft load path permits relative torsional displacement between the inner and outer ring segments 62, 64. Furthermore, the spring elements 66, in combination, produce a cantilever spring-mass system which has a natural frequency below the noise producing frequency, which, in the described embodiment, corresponds to the clash frequency of gear mesh between the inner ring segment 62 and the secondary pinions 36b of the compound planetary pinions 36.

Figure 3B:
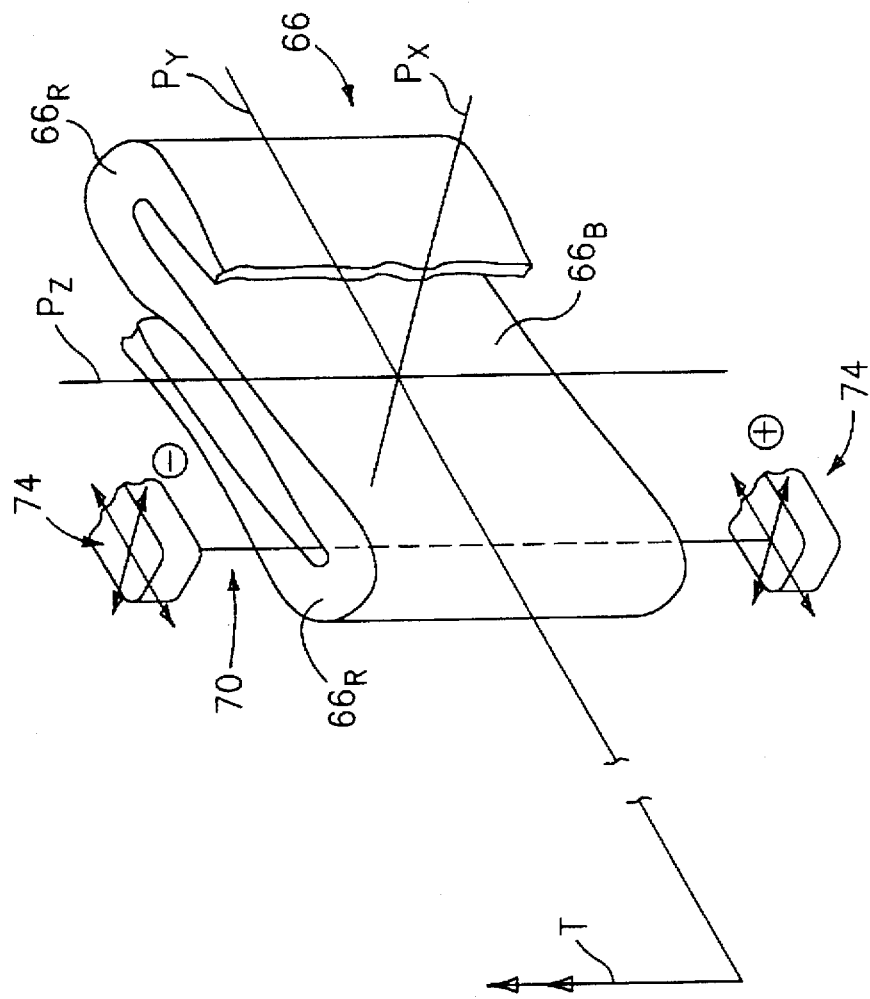
Figure 3A:
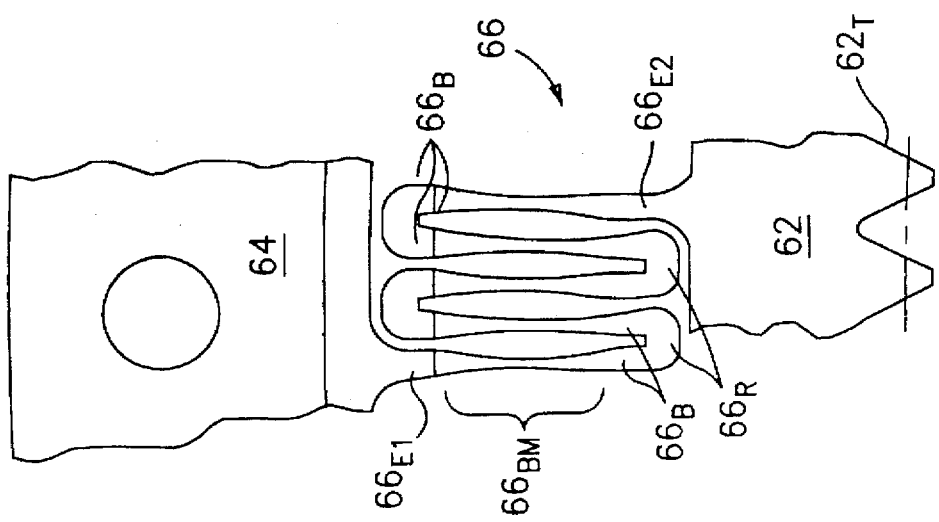
FIG. 3a depicts an enlarged top view of one of the spring elements disposed in combination with the inner and outer ring gear segments.

In FIGS. 3a and 3b, each spring element 66 includes an odd number of slender beam members $66_B$, e.g., one, three, five or more, having a first end $66_{E1}$ fixed to the outer ring segment 64 and a second end $66_{E2}$ fixed to the inner ring segment 62. In the preferred embodiment, the beam members $66_B$ are disposed radially of the torque vector T (see FIGS. 3b and 1) produced by the compound planetary drive system 12, i.e., the torque vector T driving the main rotor shaft 40. Furthermore, each beam member $66_B$ is characterized by a low bending stiffness about a principle bending axis $P_Z$ which is parallel to the torque vector T. In the context used herein, the bending stiffness about the principle bending axis $P_Z$ is a function of the beam moment of inertia and is "low" in comparison to the beam bending stiffness about axes $P_X$, $P_Y$ orthogonal to the principle bending axis $P_Z$. In the described embodiment, the bending stiffness about the principle bending axis $P_Z$ is less than about 1/1000 of the bending stiffness about an orthogonal axis $P_X$. The stiffness ratio will, of course, vary depending upon the in- and out-of-plane loads acting on the isolated ring gear 60.

In the preferred embodiment, each spring element 66 is serpentine in shape, i.e., in a top cross-sectional view, and includes five juxtaposed beam members $66_B$ and reflex segments $66_R$ which structurally interconnect adjacent beam members $66_B$. Such serpentine shape produces a series spring arrangement which increases the effective length of the spring element 66 and reduces its characteristic spring stiffness. Furthermore, the medial portion $66_{BM}$ of each beam member $66_B$ is tapered in thickness as compared to the thickness of the fixed ends $66_{E1}$, $66_{E2}$ or the reflex segments $66_R$. Such thickness tapering has the effect of further reducing the spring rate stiffness while minimizing the weight of the respective spring element 66 by producing substantially constant stress in the beam members $66_B$. While the design methodology described hereinbelow will crystallize the overall design approach, suffice it to say that the individual spring elements 66 and/or beam members $66_B$ are appropriately sized, shaped and spaced apart such that flexure of each prevents contact with adjacent spring elements 66 and/or beam members $66_B$ and such that the torsionally induced displacement is within the strain allowables of the selected spring element/isolated ring gear material.

The isolated ring gear 60 may be fabricated from a variety of metallic materials including steel, titanium, aluminum etc. which are readily cast, forged, machined and/or case hardened and which exhibit the desired mechanical properties to withstand the rigorous operating environment of a helicopter transmission. Preferably, a forged blank of such material is produced which approximates the height and diameter of the isolated ring gear 60. Conventional techniques may be employed for forming the teeth $62_T$ on the inner diameter of the inner ring segment 62 including multiple machining, annealing and carburizing steps. The spring elements 66 may be produced by a variety of techniques including Wire Electro-Discharge Machining (Wire EDM), abrasive waterjet machining, Electro-Chemical Machining (ECM) and high speed machining. In the preferred embodiment, Wire EDM is employed wherein a taught, electrically charged wire 70 is disposed through pre-drilled pilot holes (not shown), one per spring element, and is guided by a numerically controlled head 74 to selectively remove material for forming the spring elements 66. While the spring elements 66 may be formed prior to or following the fabrication of the ring gear teeth $62_T$, it is preferable to form the spring elements 66 as an intermediate step. That is, to compensate for any distortion which may occur during the Wire EDM process, it may be desirable to rough grind the gear teeth $62_T$, perform the Wire EDM process, and finish grind the gear teeth $62_T$ for the purpose of accurately controlling gear tooth geometry.

Figure 4:
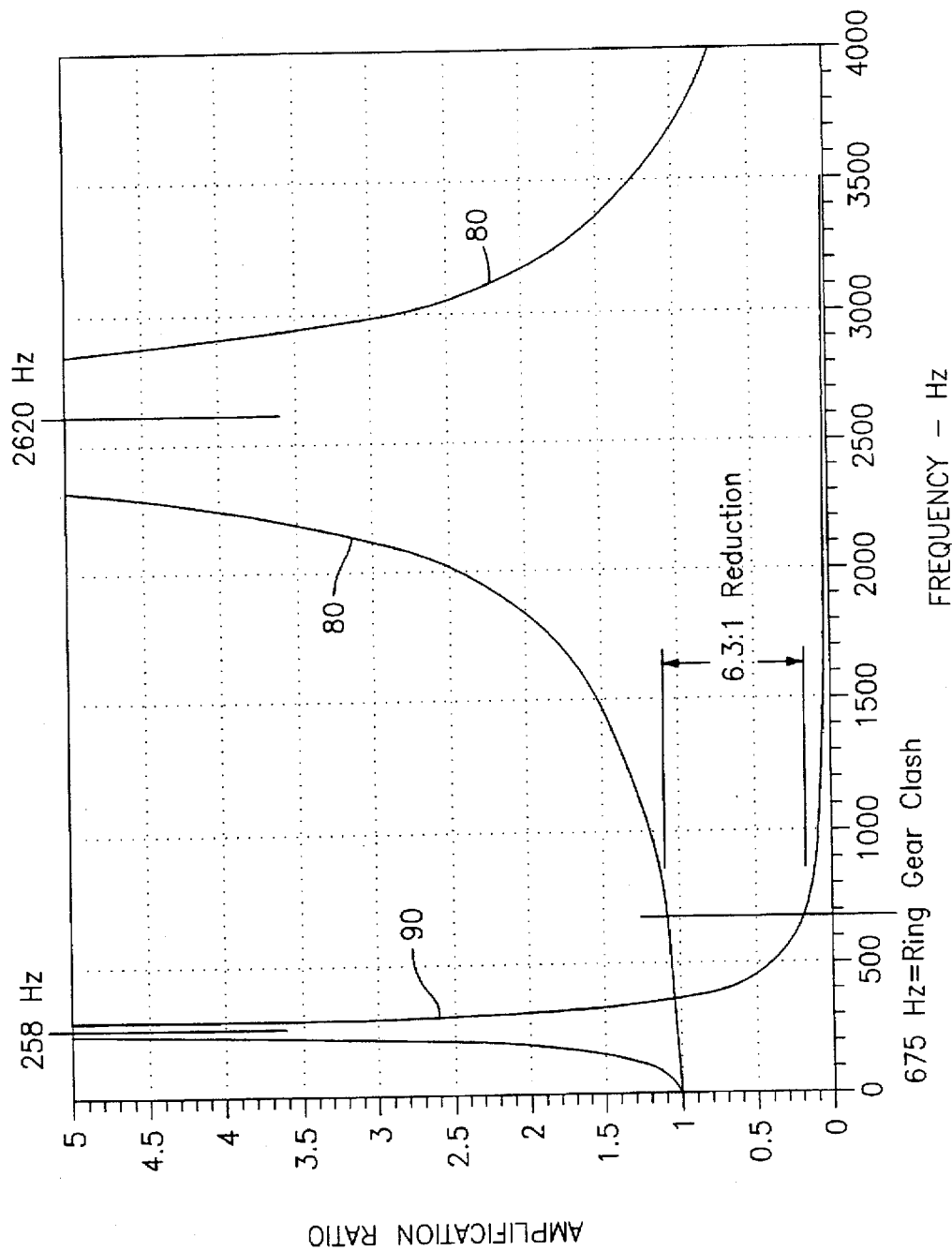
FIG. 4 is a graphical comparison of the amplification ratio for a conventional solid body ring gear and the isolated ring gear according to the present invention.

In FIG. 4, the vibration characteristics of a conventional solid body ring gear such as that shown and described in Kish U.S. Pat. No. 5,472,386 are compared to the vibration isolation characteristics of the isolated ring gear 60. The graph depicts the amplification ratio as a function of frequency which, for a linear system having a constant spring stiffness, is numerically the same as the transmissibility of vibratory forces across a structure. More specifically, the amplification ratio is the ratio of transmitted force to the applied force at a particular forcing frequency. That is, the magnitude or amplitude of a vibratory force transmitted through a structure at a particular forcing frequency may be determined by multiplying the amplification ratio by the applied vibratory force.

For the above-described compound planetary drive system 12, the clash frequency of gear mesh which produces the most aural discomfort to cockpit and/or cabin occupants is at approximately 675 Hz. Hence, the clash frequency corresponds to the aforementioned forcing frequency, and is the focus of examination for comparing the conventional solid body ring gear and the isolated ring gear 60 of the present invention. More specifically, and referring to the amplification curve 80 of the conventional solid body ring gear, the peak amplification occurs at approximately 2620 Hz which corresponds to the natural frequency of the solid body ring gear. In theory, it is at this natural frequency that a unit vibratory force is amplified to infinity ∞, however, in practice, internal damping limits the peak amplification factor. At the clash frequency or forcing frequency of 675 Hz, the amplification ratio is about 1.1. Accordingly, a unit vibratory force is increased by 10% when employing the solid body ring gear of the prior art. In contrast, and referring to the amplification curve 90 produced by the isolated ring gear 60, the natural frequency of the isolated ring gear is approximately 258 Hz and the amplification ratio at the clash frequency is about 0.175. Accordingly, a unit vibratory force is reduced by approximately 82.5% when employing the isolated ring gear 60 of the present invention. Furthermore, a direct comparison of the amplification ratios reveals that a 6.3:1 reduction in transmitted vibratory forces is achievable when employing the isolated ring gear. It will be appreciated that a greater of lesser degree of isolation may be achieved by increasing or decreasing the natural frequency of the isolated ring gear provided that the natural frequency is less than about $1/\sqrt{2}$ of the clash or forcing frequency to be isolated.

Based on the description provided thus far, a skilled artisan in the field of transmission design or vibration control would be able to practice the teachings herein and achieve results similar to those described in the preceding paragraph. To further the discussion and introduce certain alternate embodiments of the invention, the following describes a generic design methodology for optimizing the isolated ring gear 60 for a particular application. Some of the steps are optional and will be so indicated. Initially, the maximum gearbox torque T to be reacted by the isolated ring gear 60 must be determined together with the clash frequency, i.e., forcing frequency, to be isolated. Next, a threshold natural frequency of the inner ring segment 62 and the combined spring elements 66, hereinafter referred to as the "spring-mass system", must be determined to provide a threshold degree of isolation. Generally, such threshold natural frequency is calculated using a standard transmissibility expression (1.0) as follows:

$$\omega_f/\omega_{nTHRES} > \sqrt{2} \qquad (1.0)$$

wherein $\omega_{nTHRES}$ is the threshold natural frequency, and $\omega_f$ is the clash or forcing frequency. It will be apparent from the above expression that the ratio $\omega_f/\omega_{nTHRES}$ must be less than the square root of 2 to achieve a transmissibility ratio of less than 1.0. The next step involves determining the approximate space available for the spring elements, i.e., the bounds defined by and between the inner and outer ring segments 62, 64. For the bounds to be estimated, the diameter, minimum height and minimum radial thickness of the inner and outer ring segments 62, 64 must be approximated. The diameter of the inner ring segment 62 is, of course, determined by the requisite size of the planetary gear drive system 12, while the minimum height and radial thickness of each of the ring segments 62, 64 is determined by the torque loads which are to be reacted and the envelop defined by the gearbox housing 50.

The following steps involve an iterative process of 1) defining a spring element configuration, e.g., a spring element 66 having one, three, or five beam members $66_B$, a thickness dimension, a clearance dimension etc., 2) determining the maximum stresses in the spring elements 66, and 3) calculating the natural frequency of the resulting cantilever spring-mass system. More specifically, once a spring element configuration has been defined, the maximum stress allowables for the spring elements 66 are determined based on the number of load cycles, steady torque loads, geometry and material properties. Next, the stresses in the spring elements 66 are determined by finite element analysis. Lastly, the natural frequency of the spring-mass system is determined by equation (2.0) below:

$$\omega_n = \sqrt{K_T/J} \qquad (2.0)$$

wherein $K_T$ is the torsional spring constant of the combined spring elements and J is the polar moment of inertia of the "sprung" portion of the spring-mass system. The calculation of the polar moment of inertia includes the inner ring segment 62 and a portion of the spring elements which includes about 50% or less of the spring element geometry. The above steps 1 through 3 are reiterated as required to achieve a spring element configuration which provides the necessary isolation while remaining within the stress allowables of the material.

In the process of configuring the spring elements 66, it is optional to taper the medial portion $66_{BM}$ of each beam member $66_B$ so as to reduce the stiffness of the spring elements 66 and, furthermore, weight and stress optimize the individual beam members $66_B$. Depending upon the design application such tapering may be desirable to soften the spring elements 66, thus providing a greater degree of isolation. Insofar as the manufacturing approaches discussed hereinabove involve numerically controlled apparatus, the thickness tapering may be effected without adversely impacting fabrication costs.

Another design option relates to improving the fatigue life of the isolated ring gear 60 by preloading and/or limiting the maximum torque loads acting on the spring elements 66. More specifically, by preloading or applying a steady torque load on the spring elements 66, the min to max oscillatory excursions are reduced, and, consequently, so too are the min to max vibratory stresses. It will be appreciated that fatigue life, which is a function of the imposed min to max vibratory stress, will improve under preload conditions. With respect to torque limiting, many drive system applications operate within a range of torque loading wherein normal operating loads range from between 60% to 80% of the maximum torque load. For example, in the above-described compound planetary drive system 12, normal operating conditions, e.g., cruise flight, impose torque loads T which are about 70% of the max torque associated with transient maneuvers, e.g., a high rate vertical climb maneuver. By limiting the magnitude of torque loads acting on the spring elements, the fatigue life thereof may be improved yet further.

Figure 5:
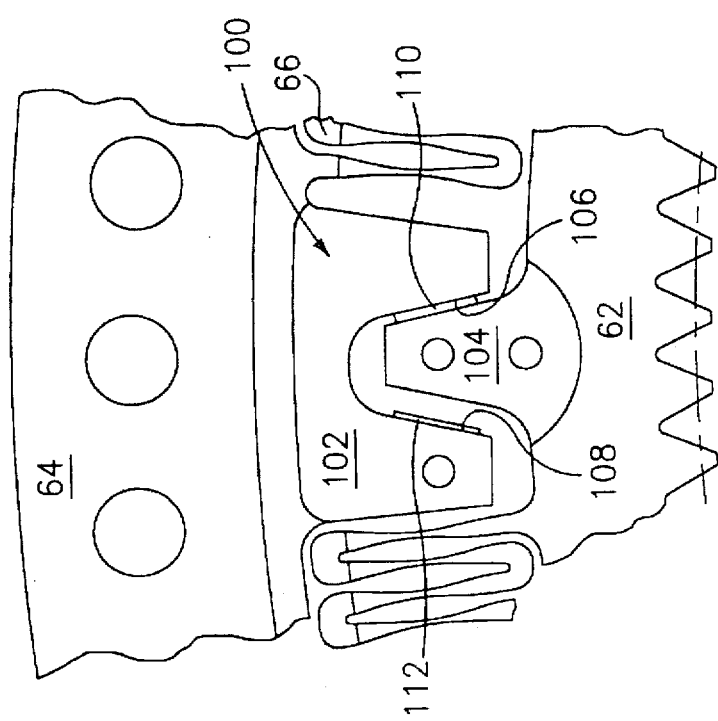
FIG. 5 is an enlarged view of a preload/torque limiting means disposed in combination with the inner and outer ring segments for preloading and/or limiting the magnitude of torque loads acting on the spring elements.

In FIG. 5 a combined preload and torque limit means 100 is disposed between and, preferably, integrally formed with, the inner and outer ring segments at several locations (see FIG. 2) for improving the fatigue life of the spring elements 66. The preload/torque limit means 100 comprises a U-shaped member 102 formed in combination with the outer ring segment 64 and an arm 104 integrally formed with and protruding radially from the inner ring segment 62. More specifically, the arm 104 is disposed between preload and torque reaction surfaces, 106 and 108, respectively, defined by the U-shaped member 104. During set-up of the isolated ring gear 60, the inner ring 62 is wound against the force of the spring elements 66 and positioned relative to the preload reaction surface 106 by means of an insertable preload shim 110. That is, upon establishing the desired preload position which, for the described embodiment, corresponds to about 40% of the maximum torque load, the shim 110 is fixedly installed and the arm 102 is caused to rest thereagainst.

In operation, the torque load T acting on the inner ring segment 62 will cause the arm 104 to disengage the shim 110, i.e., when the torque load exceeds the minimum preload value, and seek an intermediate operating position between the preload and torque reaction surfaces 106, 108. This position corresponds to the "normal" or "operating" position wherein the isolated ring gear transfers torque loads while isolating vibrations. Should torque loads exceed a threshold value, e.g., 80% of the maximum torque load, the arm 104 will engage the torque reaction surface 108 thereby transferring the additional torque load directly from the inner ring segment 62 to the outer ring segment 64. Insofar as even small manufacturing deviations can result in significant fluctuation of the prescribed torque limit value, it may be necessary to insert a torque limit shim 112 between the arm 104 and the torque reaction surface 108 to compensate for such manufacturing deviations.

Figure 7:
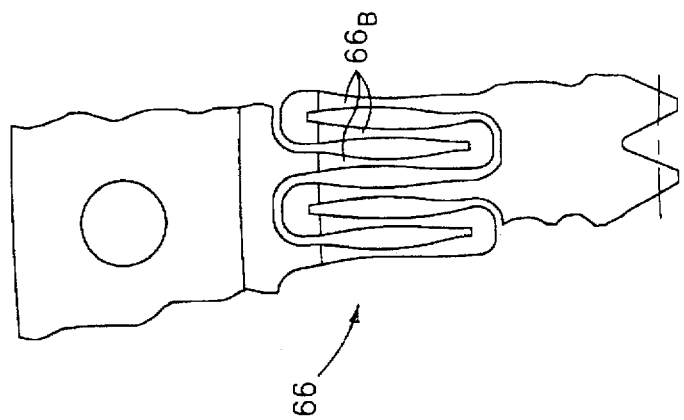
FIGS. 6 and 7 depict alternate embodiments of one of the spring elements disposed in combination with the inner and outer ring segments.
Figure 6:
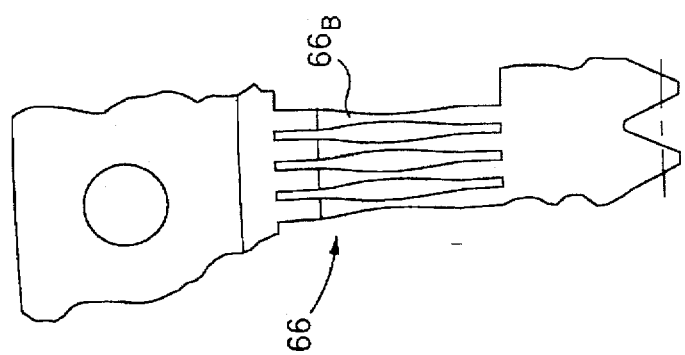

Although the invention has been shown and described with respect to exemplary embodiments thereof, it should be understood by those skilled in the art that various changes, omissions and additions may be made without departing from the spirit and scope of the present invention. For example, while the preferred embodiment describes a spring element 66 having five radial beam members 66$_B$, it will be appreciated that fewer or more such beam members 66$_B$ may be employed depending upon the torque loads and the degree of isolation desired. In FIGS. 6 and 7, alternate embodiments of the present invention are illustrated wherein the spring elements 66 comprise one and three beam members 66$_B$, respectively. Furthermore, while the preferred embodiment employs spring elements 66 disposed about the entire outermost and innermost periphery of the inner and outer ring segments 62, 64 (as shown in FIG. 2), it will be appreciated that the spring elements 66 may be symmetrically grouped about the inner and outer ring segments 62, 64 so as to create void regions therebetween. Such arrangement may benefit fabrication, e.g., lower fabrication costs, or permit access through the isolated ring gear such as may be required for conduits or passages for lubrication. Furthermore, while the beam members 66$_B$ are shown (in FIG. 3b) as being radially orientated with respect to the torque vector T of the drive system 12, it will be appreciated that the beam members 66$_B$ may be canted with respect thereto to vary the torsional stiffness in accordance with particular design objectives.

While the preload/torque limiting means 100 has been described as a integral device, i.e., a single unit, it will be appreciated that the preload and torque limit means may be constructed as independent units. Furthermore, while the preload/torque limiting means 100 of the preferred embodiment includes integrally formed, cooperating structures, e.g., the U-shaped member 102, the arm 104, preload shim 110 etc., the invention herein contemplates any means for effecting preload in the spring elements 66, or transferring a threshold level of torque across the inner and outer ring segments 62, 64.

What is claimed is:

1. An isolated ring gear (60) for a planetary gear drive system (12) and operative for transferring torque loads and reducing the transmission of high frequency vibrations from planetary pinions (36) of the drive system (12) to an adjacent support structure (50), characterized by:
    inner and outer ring segments (62, 64), said inner ring segment (62) having a plurality of teeth (62$_T$) for being disposed in intermeshing combination with the teeth (32$b_T$) of the planetary pinions (36), said outer ring segment (64) for being rigidly affixed to the adjacent support structure (50); and
    a plurality of spring elements (66) disposed between and integrally formed with said inner and outer ring segments (62, 64);
    wherein said spring elements (66) transfer torque loads from said inner ring segment (62) to said outer ring segment (64) and, furthermore, for providing a torsionally soft load path for reducing the transmission of high frequency vibrations from said inner ring segment (62) to the adjacent support structure (50).

2. The isolated ring gear (60) according to claim 1 wherein said planetary gear drive system (12) produces a torque vector T, and wherein each said spring element (66) has an odd number of beam members (66$_B$), said beam elements (66$_B$) having a predetermined bending stiffness about a principle bending axis P$_Z$ which is substantially parallel to said torque vector T.

3. The isolated ring gear (60) according to claim 2 wherein said beam members (66$_B$) of each said spring element (66) is disposed radially of said torque vector T produced by said planetary gear drive system (12).

4. The isolated ring gear (60) according to claim 2 wherein each said spring element (66) defines a spring stiffness, and wherein each said spring element (66) includes multiple beam members (66$_B$) and reflex segments (66$_R$) structurally interconnecting adjacent beam members (66$_B$) for reducing said spring stiffness.

5. The isolated ring gear (60) according to claim 1 further comprising means (104, 106, 110) for preloading said spring elements (66).

6. The isolated ring gear according to claim 1 further comprising means (104, 108) for limiting the torque loads acting on said spring elements (66).

7. The isolated ring gear (60) according to claim 5 wherein said preload means includes a radially protruding arm (104) disposed in combination with said inner ring segment (62), a preload reaction surface (106) disposed in combination with said outer ring segment (64), and a shim fixedly mounted to said preload reaction surface (106) and in abutting combination with said arm (104) for preloading said spring elements (66).

8. The isolated ring gear (60) according to claim 6 wherein said torque limiting means includes a radially protruding arm (104) disposed in combination with said inner ring segment (62), a torque reaction surface (108) disposed in combination with said outer ring segment (64), said protruding arm (102) being disposed in abutting combination with said torque limiting surface (108) for limiting the magnitude of torque loads acting on said spring elements (66).

9. The isolated ring gear (60) according to claim 4 wherein each said spring element (66) includes at least five said beam members (66$_B$).

10. The isolated ring gear (60) according to claim 4 wherein each of said beam members (66$_B$) defines a medial portion (66$_{BM}$), said medial portions (66$_{BM}$) being tapered in thickness for reducing said characteristic bending stiffness of said spring elements (66).

11. An isolated ring gear (60) for a planetary gear drive system (12) which produces a torque vector T and operative for transferring torque loads and reducing the transmission of high frequency vibrations from planetary pinions (36) of the drive system (12) to an adjacent support structure (50), characterized by:
    inner and outer ring segments (62, 64), said inner ring segment (62) having a plurality of teeth (62$_T$) for being disposed in intermeshing combination with the teeth (32$b_T$) of the planetary pinions (36), said outer ring segment (64) for being rigidly affixed to the adjacent support structure (50); and
    a plurality of spring elements (66) disposed between and integrally formed with said inner and outer ring segments (62, 64), each said spring element (66) having an odd number of beam members (66$_B$), said beam elements (66$_B$) having a predetermined bending stiffness about a principle bending axis P$_Z$ which is substantially parallel to said torque vector T.
    wherein said spring elements (66) transfer torque loads from said inner ring segment (62) to said outer ring segment (64) and, furthermore, for providing a torsionally soft load path for reducing the transmission of high frequency vibrations from said inner ring segment (62) to the adjacent support structure (50).

12. The isolated ring gear (60) according to claim 11 wherein said beam members (66$_B$) of each said spring element (66) is disposed radially of said torque vector T produced by said planetary gear drive system (12).

13. The isolated ring gear (60) according to claim 11 wherein each said spring element (66) defines a spring stiffness, and wherein each said spring element (66) includes multiple beam members ($66_B$) and reflex segments ($66_R$) structurally interconnecting adjacent beam members ($66_B$) for reducing said spring stiffness.

\* \* \* \* \*